United States Patent
Koelblin et al.

[11] Patent Number: 6,066,078
[45] Date of Patent: *May 23, 2000

[54] MACHINE TOOL WITH HORIZONTAL SPINDLES

[75] Inventors: Rolf Koelblin, Remscheid; Reinhard Schneider, Bergneustadt; Werner Mueller, Essen; Horst Fein, Duesseldorf, all of Germany

[73] Assignee: Honsberg Lamb Sonderwerkzeugmaschinen GmbH, Germany

[*] Notice: This patent is subject to a terminal disclaimer.

[21] Appl. No.: 09/336,725

[22] Filed: Jun. 21, 1999

Related U.S. Application Data

[63] Continuation of application No. 08/875,611, Jul. 31, 1997, Pat. No. 5,944,643.

[30] Foreign Application Priority Data

Feb. 3, 1995 [DE] Germany .............................. 195 03 482
Jan. 4, 1996 [EP] European Pat. Off. .. PCT/EP96/00016

[51] Int. Cl.$^7$ ................................................. B23Q 3/157
[52] U.S. Cl. ................................. 483/55; 483/13; 483/31; 483/56; 483/68
[58] Field of Search .................................. 483/1, 54, 55, 483/56, 66, 68, 13, 31, 32, 30; 409/202, 212, 203, 217

[56] References Cited

U.S. PATENT DOCUMENTS

| | | |
|---|---|---|
| 3,238,615 | 3/1966 | Leone et al. . |
| 3,990,585 | 11/1976 | Johansson . |
| 4,216,572 | 8/1980 | Matsushita et al. . |
| 4,354,306 | 10/1982 | Ida et al. . |
| 4,654,954 | 4/1987 | Bayes et al. . |
| 4,715,108 | 12/1987 | Sugiyama et al. . |
| 4,759,114 | 7/1988 | Babel . |
| 4,783,902 | 11/1988 | Novak . |
| 4,807,353 | 2/1989 | Corson et al. ............................ 483/10 |
| 4,962,583 | 10/1990 | Yang ........................................ 483/32 |
| 5,468,101 | 11/1995 | Shoda ..................................... 409/202 |
| 5,486,151 | 1/1996 | Bergmann et al. ...................... 483/56 |
| 5,662,568 | 9/1997 | Lindem .................................... 483/30 |
| 5,868,656 | 2/1999 | Rütschle .................................. 483/44 |

FOREIGN PATENT DOCUMENTS

| | | |
|---|---|---|
| 208125 | 9/1982 | European Pat. Off. . |
| 59-47136 | 9/1982 | Japan . |
| 1-159151 | 12/1987 | Japan . |
| 89235 | 4/1988 | Japan ..................................... 483/30 |
| 3-92236 | 9/1989 | Japan . |
| 1742029 | 6/1992 | U.S.S.R. ................................. 483/30 |
| 2167325 | 11/1984 | United Kingdom . |

*Primary Examiner*—William Briggs
*Attorney, Agent, or Firm*—Diller, Ramik & Wight, PC

[57] ABSTRACT

The machine tool comprises two headstocks (16,17), arranged on a support (10), which are movable independently of each other along their height and their longitudinal direction. A respective one (17) of the headstocks is active in the treatment of a workpiece attached on a workpiece carrier (20), while the other headstock (16) can be moved behind a tool magazine (24) for receiving a tool therefrom. While the one headstock is still working on the workpiece, the other headstock with the next tool can already be accelerated to the required working rotational speed and be advanced to the tool. Thus, the time required for exchange of tools is extremely shortened.

2 Claims, 4 Drawing Sheets

MACHINE TOOL WITH HORIZONTAL SPINDLES

CROSS-REFERENCE TO RELATED APPLICATION

This application is a continuation application of U.S. patent application Ser. No. 08/875,611 filed Jan. 31, 1997 in the name of Rolf Koelblin et al., and now U.S. Pat. No. 5,944,643 issued on Aug. 31, 1999.

BACKGROUND OF THE INVENTION

The invention is directed to a machine tool for the drilling and/or grinding treatment of workpieces, comprising at least two headstocks.

Machine tools are known wherein the headstock removes or resp. returns the tools directly from/into a fixed or movable tool magazine. In such machine tools, the headstock must be advanced to the tool magazine upon completion of a treatment process. At the tool magazine, the tools are exchanged, and the headstock is subsequently guided back to the workpiece. The exchanging of tools requires a considerable length of time, which is caused not only by the movement processes to be performed by the headstock but also by the time losses due to the decelerating and accelerating of the working spindle. Throughout the exchanging of tools, the machine tool is not available for treatment processes.

In machine tools comprising a large number of working spindles in a revolver configuration, the removing of one working spindle from the workpiece and the advancing of another working spindle to the workpiece along with the coupling and accelerating processes takes considerable time. Although, during operation of one working spindle, another working spindle can be equipped with new tools, this will require high expenditure in working spindles. Further, such an approach necessitates the use of a tool magazine which is advanced to the revolver system located in its operating position.

A machine tool forming basis of the preamble of claim 1 is known from JP 59-69242 A (Patent Abstracts of Japan M-317, Aug. 15, 1984, Vol. 8, No. 177). This machine tool is provided with a support whereon two headstocks are movable in vertical direction independently of each other. Each headstock has a dedicated tool magazine arranged there above which is moved together with the headstock. The transfer of the tools from a tool magazine to the appertaining headstock is performed by a swivel arm. The whole support of the machine tool is displaceable in feeding direction (towards the tool). This machine tool offers the advantage that a respective one of the headstocks can engage the workpiece while an exchange of tools can be carried out on another headstock. Thus, considerable time is saved because no time requirements exist for exchanging the tools.

Further, a machine tool known from Patent DD 263 725 A1 comprises a single headstock to be displaced vertically on the support. Additionally, the headstock can be moved horizontally in its longitudinal direction to allow exchange of tools using a tool magazine. The tool magazine is arranged before the machine support and carries various tools on a horizontally moveable slider, such that each tool can be moved into a transfer position for the headstock. The guiding path for the tool magazine must be at least twice as long as the magazine slider carrying the tools.

SUMMARY OF THE INVENTION

It is an object of the invention to provide a machine tool which is very straightforward in construction and allows a very quick exchange of tools.

According to the invention, the above object is solved by the features indicated in claim 1.

In the machine tool of the invention, two headstocks are movable independently of each other on the support along vertical guides. Further, each headstock is movable horizontally in its longitudinal direction. While one of the headstocks carries out a treatment on the workpiece by means of a tool, the other headstock is free to move to a workpiece magazine, deposit the old tool and take up a new tool. When the headstock performing the treatment has finished its operation, it will be retreated, and the headstock carrying the new tool will be applied to the workpiece. In this manner, the tool exchange time after completion of a treatment step can be limited to that length of time which is normally needed for the process from one operating position to the next one. Thus, nearly no additional time or no time at all is required for exchanging the tools. The exchange of tools can be carried out in about one second. Treatment of the workpieces is performed by alternative operation of the two headstocks, wherein respectively one headstock is active in treating the workpiece while the other either performs an exchange of tools or is kept waiting in a standby position.

The tool magazine provided in common for both headstocks has two exchange positions, i.e. one for each headstock. Under automatic control of the tool magazine, the individual tools are moved into the exchange position for the respective headstock for which they are determined. The headstocks are guided behind the tool magazine to take over the tool positioned in the exchange position, by carrying out a simple advance movement. Therefore, no transfer devices are required between the tool magazine and the headstock. The tool magazine has a short constructional length and a high storing capacity for tools, both headstocks being serviced by the horizontal lower strand of the circulating magazine, with the exchange positions being arranged at the same height.

The double arrangement of the headstocks provides for a decoupling between the moving sequence for treatment (essential operating time) and the exchange of tools (auxiliary process time). Through the alternating use of the respective headstock equipped with the new tool and accelerated to the operating rotational speed, the nonproductive auxiliary process times are practically eliminated. Because of said decoupling effect, the moving processes involved in the exchanging of tools can be determined in such a manner that acceleration jumps and jolts are largely prevented, especially during run-up and slow-down of the working spindle of a headstock, during magazine and tool clamping movements and during axial movement of the headstock for tool exchange. Thus, the lifespan of the mechanical and electrical components is increased.

The headstocks can be designed for different power specifications, the respective current task being performed by that headstock which is suited for the treatment process in question. Thus, for instance, one headstock can be dimensioned for power machining by means of large grinding tools, and the other one can be dimensioned for the use of high-speed drilling tools.

A further advantage resides in that the operability of the machine tool is still maintained even in case of failure of one headstock, although more time will be required in this case for the exchange of tools. Further, it is possible under certain conditions to treat two workpieces simultaneously and in parallel.

Preferably, the support of the machine tool is a portal support comprising two vertical posts and a crosshead. In this arrangement, the guiding paths of the headstocks are located on the mutually confronting inner sides of the posts. Alternatively, use can be made of a support which consists of a single post and wherein the guiding paths of the spindle heads are located on the mutually averted outer sides. The tool magazine is arranged in an advanced position on the front side of the support.

Preferably, the tool magazine is arranged on the upper end of the support, although it can likewise be arranged on the lower end, e.g. in the base portion of the machine. If the tool magazine is provided on the upper end of the support, the large height will make it difficult for the operating person to load the tool magazine with tools. According to a preferred embodiment of the invention, the tool magazine can be pivoted about an axis near one of its ends to thus lower the other end into a loading position.

The machine tool preferably comprises a workpiece carrier which transversely to the lengthwise orientation of the headstocks is displaceable in a horizontal direction. A machine tool of this type constitutes a self-contained treatment unit. By integration of the workpiece carrier into a transfer line, the machine can also be used as a flexible working station in interlinked systems.

Preferably, the controlling of the machine tool is performed completely in numerical fashion, i.e. all of the moving processes of the headstocks, the tool magazine and the workpiece carrier are controlled according to a predetermined program sequence and are coordinated with each other, so that all movements are carried out automatically.

An embodiment of the invention will be explained in greater detail hereunder with reference to the drawings.

DESCRIPTION OF THE PREFERRED EMBODIMENTS

Figure 1:
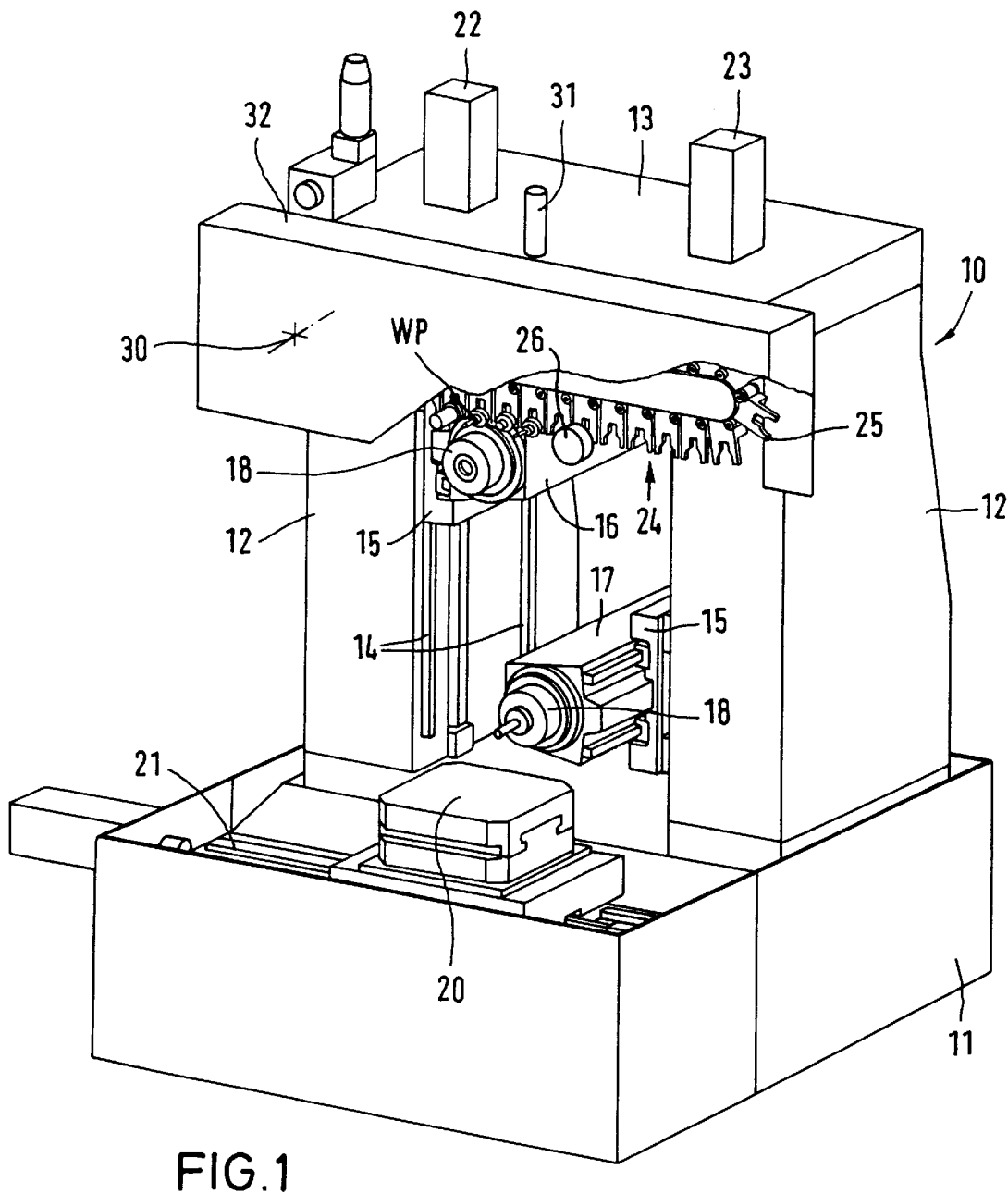
FIG. 1 is a partially cut-out perspective view of the machine tool.

According to FIG. 1, the machine tool comprises a support 10 projecting from a base 11. Support 10 is provided as a portal support comprising two mutually spaced vertical posts 12 having their upper ends connected to each other by a crosshead 13.

Arranged on the mutually confronting inner sides of the posts 12 are vertical guides 14 for respectively one vertically movable slider 15. Each slider 15 comprises a horizontal guide for horizontal movement of a headstock 16 or resp. 17 therealong. Within the headstock 16 or resp. 17, there is arranged a drive unit for a working spindle 18 which projects from the front end of the headstock and comprises a receiving portion for a tool.

In front of support 10, a workpiece carrier 20 is arranged on base 11 in a manner allowing displacement along a horizontal guide means 21 transversely to the lengthwise direction of headstocks 16 and 17. This moving direction of workpiece carrier 20 is the X-direction, the vertical direction is the Y-direction and the longitudinal direction of headstocks 16,17 is the Z-direction.

In the illustrated embodiment, the workpiece carrier 20 is movable exclusively in the X-direction. The movements in the Y- and Z-directions are carried out by the respective headstock.

Workpiece carrier 20 can be provided with a rotary table, a turning arrangement, a pallet clamping device, a pallet exchange device and the like. It is imperative that the workpiece carrier 20 be able to receive and position the workpiece in an exactly defined manner.

Drive units 22,23 for the vertical movements of headstocks 16,17 are arranged on crosshead 13. The headstocks are individually displaceable independently from each other in Y- and Z-directions. While, for instance, headstock 17 is involved in treatment of a workpiece, headstock 16 can be moved into a take-up position for tool exchange.

A tool magazine 24 is arranged in an advanced position (i.e. in front of the support) at a fixed height on support 10. The tool magazine comprises an endless conveying means, i.e. a chain, arranged for endless movement in a vertical plane and having outwardly projecting tool holding units 25 attached thereon. Tool magazine 24 is of an elongate shape, and those of the tool holding units 25 which project from the horizontal lower strand can be engaged by the headstocks. The tool holding units 25 are provided with gripper arms for holding respectively one tool 26.

Figure 2:
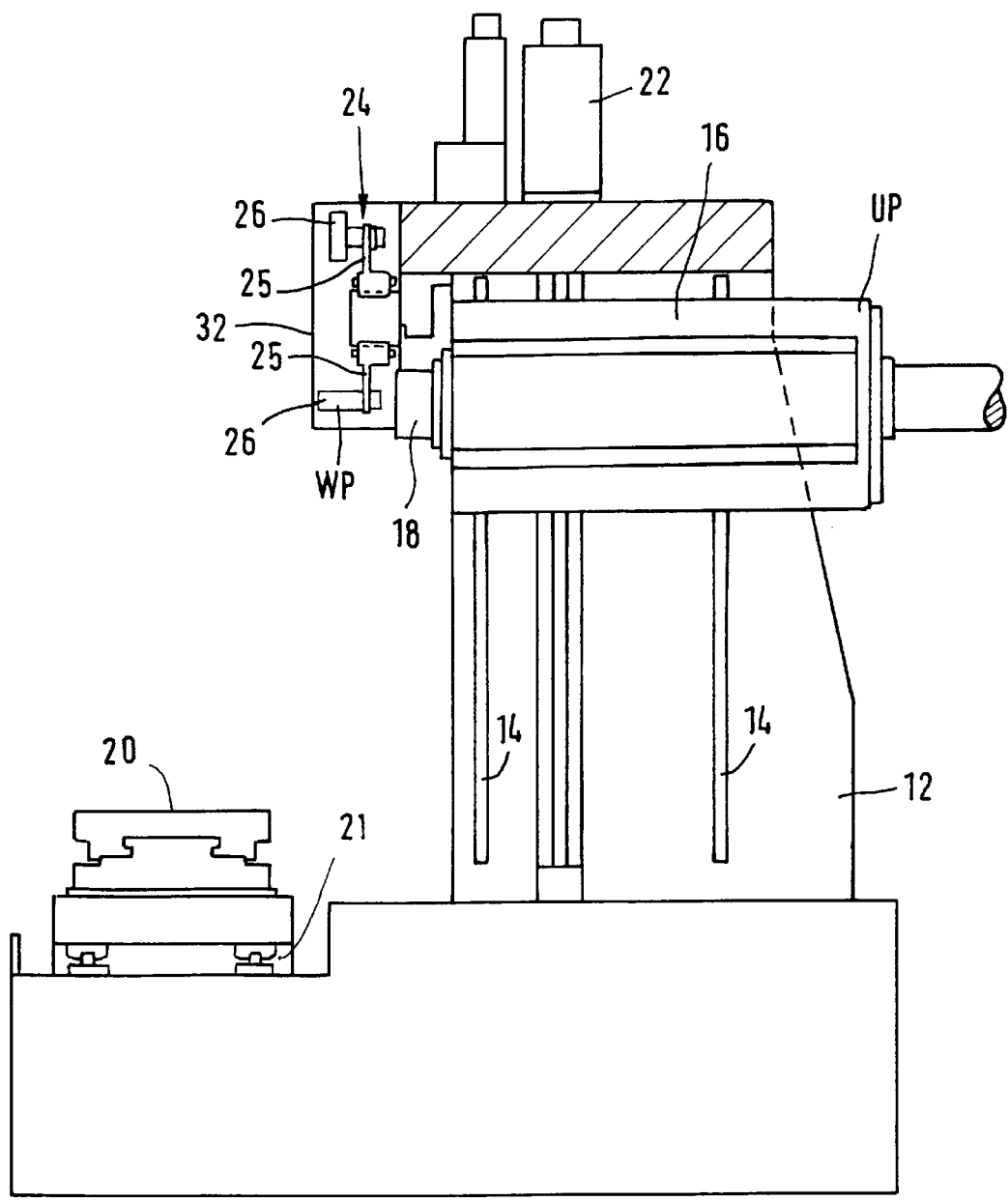
FIG. 2 is a side view of the machine tool, with the upper portion and the tool magazine viewed in cross section.

As shown in FIG. 2, headstock 16 can be moved upwards into a takeover position UP behind tool magazine 24. The takeover position is the upper end position of headstock 16 in the Y-direction and at the same time the rear end position in the Z-direction. In the takeover position, the spindle 18 is in axial alignment behind that tool 26 which is in the exchange position WP in the horizontal lower strand of tool magazine 24. When headstock 16 is slightly advanced out of takeover position UP in the direction of the Z-axis, headstock 16 seizes the rear end of tool 26 by the receiving portion of working spindle 18. Simultaneously, tool 26 is being secured in working spindle 18. Subsequently, the headstock 16 can move downwardly and, in doing so, detach the tool 26 from the tool magazine 24. At the height of its lower strand, tool magazine 24 has two exchange positions, notably one for each headstock.

Figure 3:
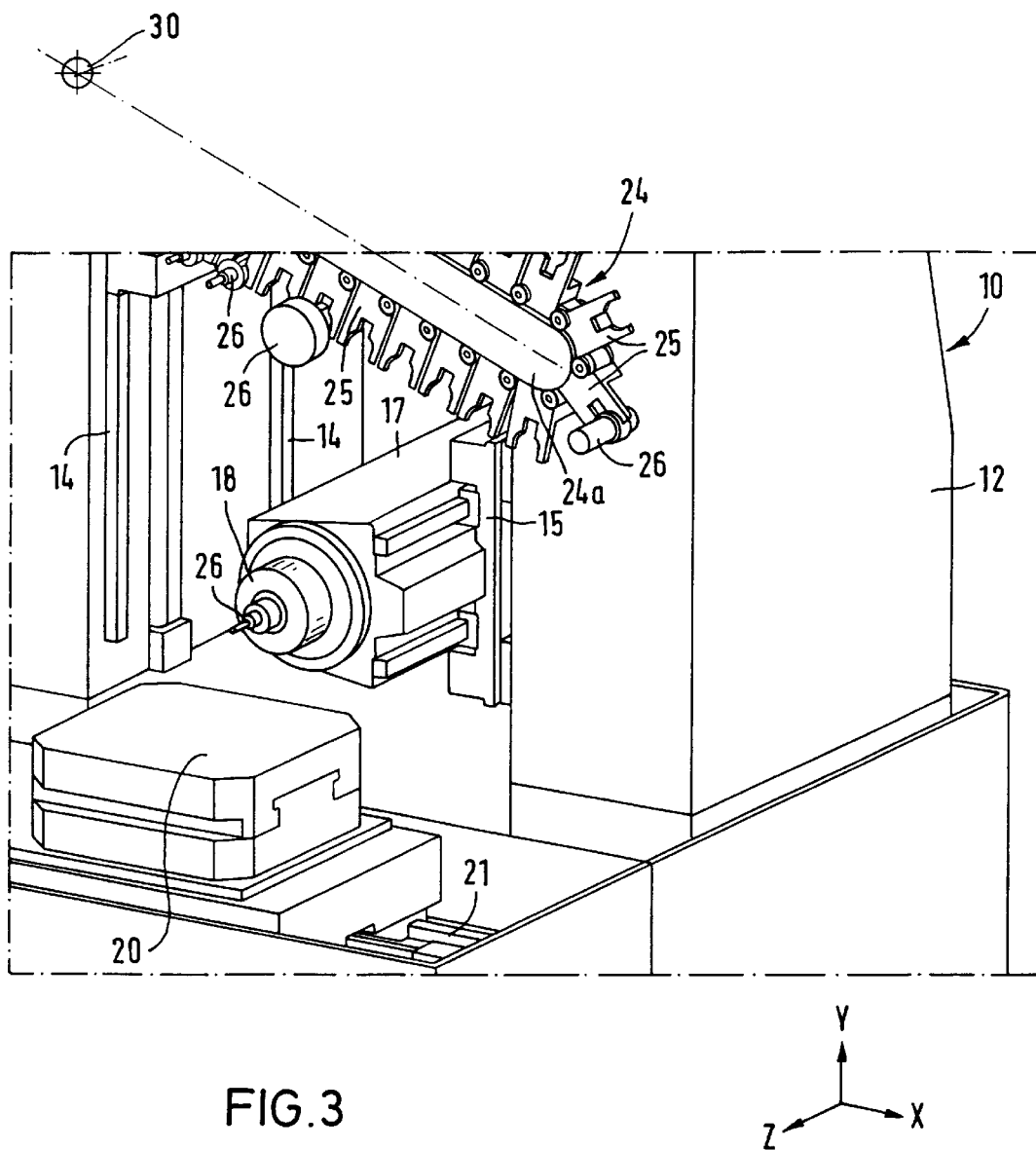
FIG. 3 is a partial view of FIG. 1, with the tool magazine pivoted down into the loading position.

To make it easier for an operating person to manually load tools into the tool magazine 24 arranged on the upper end of support 10, the tool magazine can be pivoted about a horizontal pivot axis 30 which is schematically indicated—although not explicitly shown—in FIG. 1. The pivot axis 30 is arranged in the vicinity of one end of the elongate tool magazine. When pivoting the tool magazine about pivot axis 30, it will take the pivoting position shown in FIG. 3 wherein the end 24a has been pivoted downwards. Thus, the tools 26 near the downwardly pivoted end 24a are easily accessible. For pivoting the tool magazine, a cylinder 31 is arranged on crosshead 13. The chain of tool magazine 24 is driven by a numerically controlled drive unit so that the individual tool holding units 25 can be moved respectively into the desired position.

The tool magazine 24 is covered by a hood 32 attached on the upper end of support 10 and being open only in downward direction.

Figure 4:
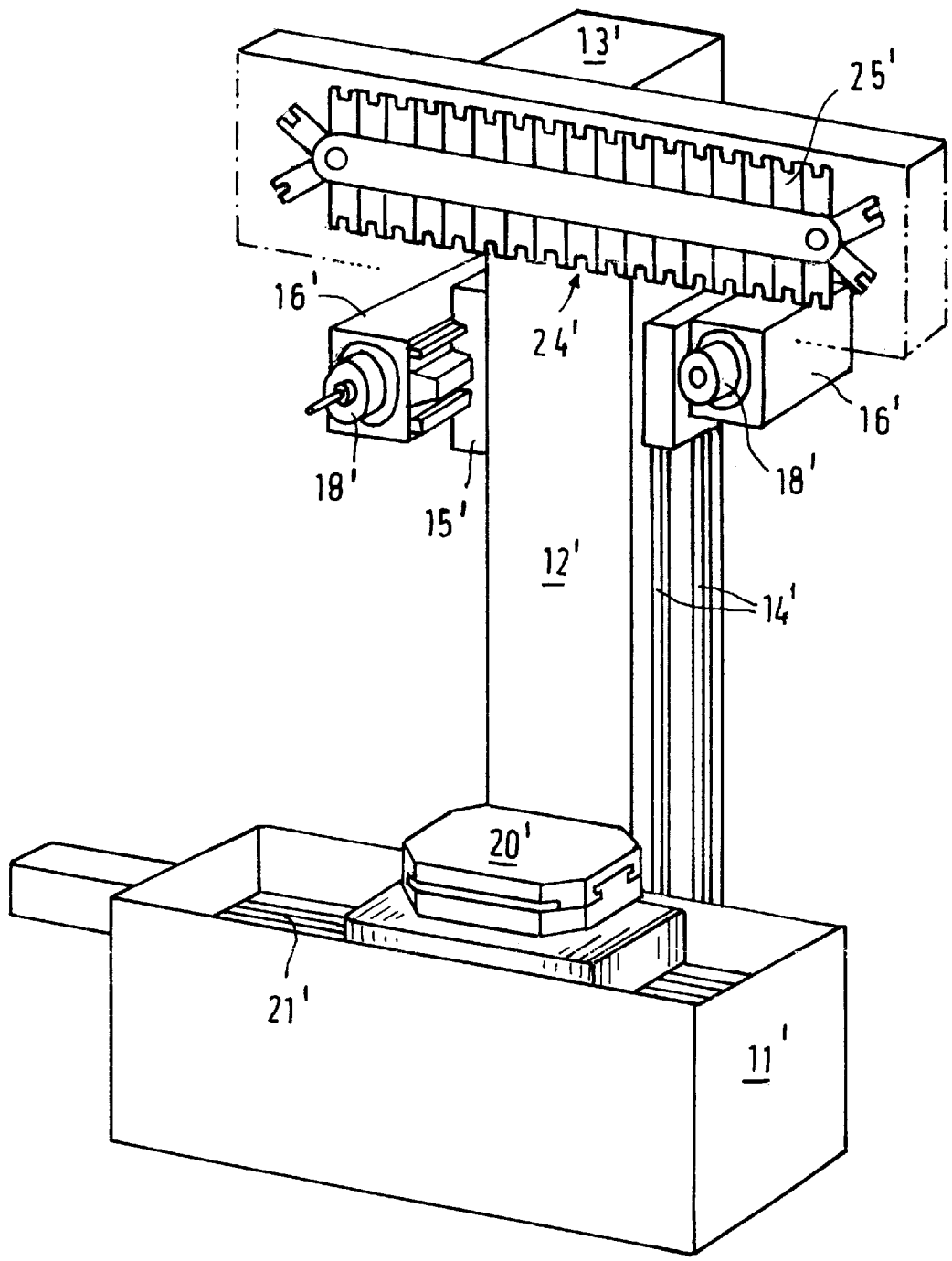
FIG. 4 is a perspective view of another machine tool, and illustrates a single post wherein guide paths associated with spindle heads are located on mutually adverted outer sides of the post.

Another machine tool constructed in accordance with this invention is illustrated in FIG. 4 of the drawings and is identified by reference numerals corresponding to those of the machine tool of FIG. 1, although being primed to indicate identity of structure and function. As compared to the machine tool of FIG. 1, the machine tool of FIG. 4 utilizes a support which comprises a single post 12' wherein guide paths 14' for the spindle heads or working spindles 18' are located on mutually averted or opposite outer sides of the single post 12'.

Although a preferred embodiment of the invention has been specifically illustrated and described herein, it is to be understood that minor variations may be made in the apparatus without departing from the spirit and scope of the invention, as defined the appended claims.

What is claimed is:

1. A machine tool comprising a support (10) including at least one vertical post (12), two headstocks (16, 17) vertically movable along said at least one vertical post (12), means (22, 23) for moving said headstocks (16, 17) independently relative to each other along substantially vertical guides (14) carried by said at least one vertical post (12), means for moving said headstocks (16, 17) independently relative to each other in a longitudinal direction substantially horizontally relative to the support (10), a tool magazine (24) provided in common for both headstocks (16, 17), said tool magazine (24) being constructed and arranged as an elongated circulating magazine, each of the headstocks (16, 17) being independently movable into a takeover position (UP) for receiving a tool (26) from the tool magazine (24) when in an exchange position (WP), the circulating tool magazine (24) being stationary during tool transfer and including an individual exchange position (WP) for each headstock (16, 17); the tools (26) in the tool magazine (24) being arranged in such a manner that, with the headstock (16, 17) disposed in the takeover position (UP), the tool (26) disposed in an exchange position (WP) is axially oriented relative to the headstock (16, 17); and each headstock (16, 17), while in its takeover position (UP) for the take-over of a tool (26), being independently advanced in its longitudinal direction.

2. A machine tool comprising a support (10) including at least one vertical post (12), two headstocks (16, 17) vertically movable along said at least one vertical post (12), said two headstocks each including a spindle rotatable relative to an associated spindle axis, said spindle axes being disposed in substantially parallel relationship to each other, means carried by said at least one vertical post (12) for guiding said headstocks for individual independent movement along substantially vertical parallel paths which are substantially normal to said spindle axes, a tool magazine carrying a plurality of tools in associated tool holders, means for selectively moving said tool holders along a path of travel which substantially intersects each spindle axis at an intersection position for tool takeover, means for individually moving said headstocks along said guiding means to selectively bring each spindle axis to its intersection position, each tool having a tool axis coaxial to a spindle axis at an intersection position incident to tool removal, and means for selectively moving each headstock independently along its spindle axis and an associated substantially coaxial tool axis to remove a tool from an associated tool holder.

* * * * *